Jan. 31, 1967   R. A. BUCHROEDER ETAL   3,301,130
TRIPLET TYPE OF SYMMETRICAL COPYING LENS
Filed April 13, 1966

RICHARD A. BUCHROEDER
GEORGE F. ZIEGLER
INVENTORS

BY Frank O. Parker

ATTORNEY 3,301,130
TRIPLET TYPE OF SYMMETRICAL COPYING LENS
Richard A. Buchroeder, Brighton, and George F. Ziegler, Gates, N.Y., assignors to Bausch & Lomb Incorporated, Rochester, N.Y., a corporation of New York
Filed Apr. 13, 1966, Ser. No. 542,412
5 Claims. (Cl. 350—227)

The present invention relates to a quasi-symmetrical triplet type of optical objective which is particularly suited to copying operations. More particularly, it relates to improvements in copying objectives which work at unequal conjugates.

Objectives of the above-mentioned type are especially advantageous for projecting a planar object surface at at unity or other magnification onto a planar imaging surface because of the high fidelity of the image formed thereby. The objective comprising Example I of the present invention has been developed from prototypes which are exemplified by the Voigtlander German Patent No. 342,937, which issued on March 12, 1921, the cited lens being characterized by a pair of duplicate collective meniscus doublets which are concave toward each other and have a symmetrical dispersion lens spaced therebetween.

The objective comprising Example II of this present invention is a further development using Example I as a starting point, and differs from Example I in that the oblique spherical aberration is corrected to a greater degree. Examination of Examples I and II shows that there are only minor differences in the constructional parameters of the two examples. A table of inequalities based on these differences in constructional parameters forms a part of the present invention and appears hereinafter.

To improve certain performance characteristics of the abovementioned prototypes, it is an object of the present invention to provide a novel triplet type of quasi-symmetrical copying lens or objective having precision imaging qualities at all magnifications between $-0.45\times$ and $-0.95\times$ wherein the minus (—) sign denotes that the image is inverted.

It is a further object to provide such a device wherein the coma condition is improved in objectives having unequal conjugates, said objective being of relatively simple construction and consequently of comparatively low cost for an objective which is very well corrected for zonal spherical aberration, longitudinal and lateral chromatic aberrations, astigmatism, distortion, curvature of field, and oblique spherical aberration.

Further objects and advantages will be apparent from a study of the following specification taken together with the accompanying drawing, wherein.

Figure 3:
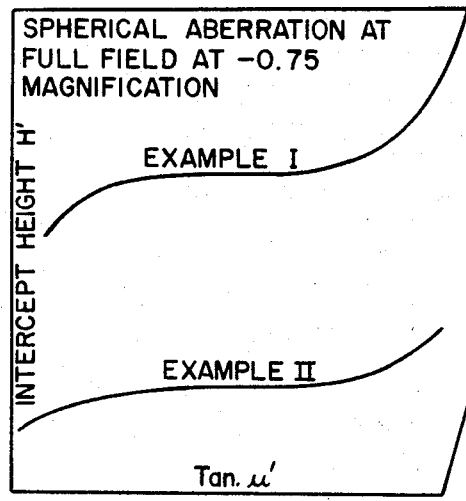
FIG. 3 is a graph showing the difference in the oblique spherical aberration correction between the aforesaid Example I and Example II.
Figure 1:
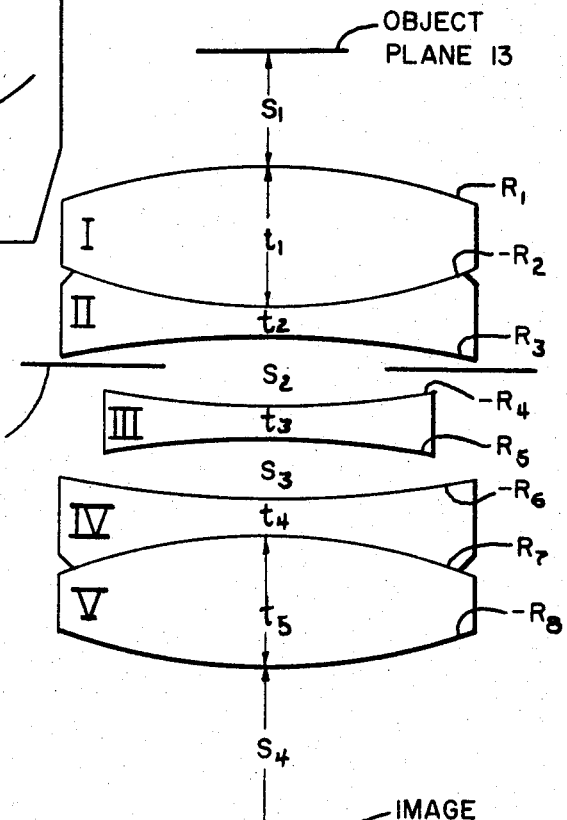
FIG. 1 is an optical diagram representing Example I and Example II of the present invention.

The aforesaid objective is generally designated in both Example I and Example II by the numeral 10 in the drawing and comprises a front lens member consisting of a double convex lens element designated I which lies in contact with a rearward double concave lens element designated II. The rear lens member is a substantial duplicate of the front compound lens member and consists of a double concave lens element designated IV which lies in contact with a rearward double convex lens element designated V. Between the aforesaid lens members is located a double concave lens element which is designated III, said lens element III being spaced from the lens members at either side and being optically aligned therewith. In the space between the front compound lens members and the intermediate lens III is positioned a diaphragm 11. An image is formed by the objective 10 at a rearwardly located image plane 12 of an object located at an object plane 13. The nearly symmetrical construction of the objective 10 is so specified that the objective gives excellent performance when working particularly at unequal conjugates, the object distance $S_1$ and the image distance $S_4$ being specified as to the values of those distances at different magneficiations, as shown in the chart herebelow which relates to Example I.

| Magnification | $S_1$ | $S_4$ |
|---|---|---|
| $-0.45\times$ | 3.15F | 1.362F |
| $-0.62\times$ | 2.54F | 1.530F |
| $-0.75\times$ | 2.26F | 1.663F |
| $-0.95\times$ | 1.97F | 1.863F |

Figure 2:
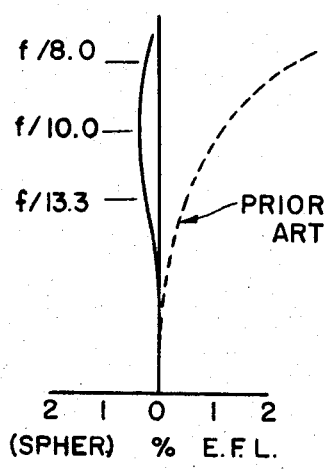
FIG. 2 is a graph showing substantially the condition of spherical aberration related to various lens openings or f/numbers as found in both Example I and Example II.

In order to improve the relative aperture of prior art prototypes to a value of f/8.0, the thicknesses $t_1$ and $t_5$ were increased. Such an increase in thicknesses $t_1$ and $t_5$ further results in a great improvement of the correction of zonal spherical aberrations as shown in FIG. 2 particularly with regard to Example I of the invention. It is necessary in a quasi-symmetrical objective having unequal conjugates to correct coma aberration by making the air spaces $S_2$ and $S_3$ of unequal value as indicated in the subsequent tables of values.

Regarding Example II of the invention, a considerable improvement of oblique spherical aberration has been achieved by small simultaneous variations from Example I in all lens surface radii, lens axial thicknesses, and axial air spaces. The aforesaid improvements have been obtained while generally maintaining or bettering the other optical performances of the lens with regard to chromatic conditions as well as astigmatism, distortion and curvature of field.

In all forms of the present invention the compound lens members are positive meniscus in form and are concave toward each other, the equivalent focal lengths thereof being substantially equal to each other and having a value lying between .44F and .47F. Correspondingly, the interposed lens member III is double concave in form and is substantially symmetrical, the value of its focal length lying between $-.25F$ and $-.27F$ wherein F designates the normal equivalent focal length of the entire objective 10.

The above values are inclusive of a number of closely related quasi-symmetrical and non-ideal copying objectives which result from the manufacture of a nominal objective of the above-described form by modern economical manufacturing techniques, each objective being slightly different from the others with regard to the specific values of the lens parameters, but all of the values being included in the ranges above stated and in the ranges of values stated in the expressions of inequality hereinafter.

It is well known in the art that most high-grade lens designs are actually computed for manufacture from a very definite supply of glass or glasses having closely prescribed properties. When the original supply of glass is exhausted, further production of the lens involves recomputation of the design parameters to suit the actual optical properties of the new supply of glass which, although close, said properties are nevertheless different to some small degree from the original glass supply. These recomputations which permit utilization of different batches of glass, result in the aforementioned plurality of "closely related quasi-symmetrical copying objectives," all of which differ from each other slightly in the values of the lens focal lengths, and also in any or all of the other constructional data set forth in the tables herebelow.

Furthermore, the relative axial thicknesses of the lens elements II, III and IV in the Example II of the present objective 10 are greater than the corresponding dimensions of the first form of the invention whereby the strength of the lens element is greatly improved and thereby resists the distorting warping tendency of the cemented interfaces $R_2$ and $R_7$.

In Table I of inequalities comprehensive values are given for the lens parameters included in both Examples I and II stated herebelow, wherein $S_2$ and $S_3$ represent the front and rear interlens air spaces respectively, $t_1$ to $t_5$ represent the axial thicknesses of the successive lens elements I to V respectively, and $R_1$ to $-R_8$ represent the successive lens surfaces formed on said lens elements wherein the minus (—) sign applies to the curvatures whose centers lie on the long conjugate side of the respective surfaces, the values of the parameters being given in terms of F, which represents the equivalent focal length of objective 10.

*Table I   (Examples I and II)*

$.020F < S_2 < .026F$
$.018F < S_3 < .024F$
$.037F < t_1 < .050F$
$.013F < t_2 < .020F$
$.012F < t_3 < .015F$
$.013F < t_4 < .020F$
$.037F < t_5 < .050F$
$.28F < R_1 < .30F$
$.20F < R_2 < .23F$
$1.42F < R_3 < 1.74F$
$.27F < R_4 < .29F$
$.27F < R_5 < .29F$
$1.42F < R_6 < 1.74F$
$.20F < R_7 < .23F$
$.28F < R_8 < .30F$

Corresponding absolute numerical values for refractive index $n_D$ and Abbe number $\nu$ of the optical material from which the lens elements I to V are formed are set forth in Table II of mathematical statements herebelow,

*Table II   (Examples I and II)*

$1.609 < n_D(I) = n_D(V) < 1.613$
$1.527 < n_D(II) = n_D(IV) < 1.530$
$1.527 < n_D(III) < 1.530$
$58.0 < \nu(I) = \nu(V) < 61.0$
$51.0 < \nu(II) = \nu(IV) < 53.0$
$51.0 < \nu(III) < 53.0$

The individual values of the optical parameters by which Example I of the present quasi-symmetrical objective is constructed are given more specifically in Table III herebelow, the symbolism used therein being the same as found in Table II, said values being given substantially in terms of F as aforesaid.

*Table III   (Example I)*

$F_{I,II} = F_{IV,V} = .45F$
$-F_{III} = -.26F$
$S_2 = .025F$
$S_3 = .022F$
$t_1 = t_5 = .0498F$
$t_2 = t_4 = .0136F$
$t_3 = .13F$
$R_1 = -R_8 = .29F$
$-R_2 = R_7 = .208F$
$R_3 = -R_6 = 1.73F$
$-R_4 = R_5 = .281F$

The absolute values for the refractive index ($n_D$) and Abbe number ($\nu$) relating to the glasses from which the lens elements I to V in Example I are made are given substantially in the supplementary Table IIIA herebelow,

*Table IIIA   (Example I)*

$n_D(I) = n_D(V) = 1.611$
$n_D(II) = n_D(IV) = 1.528$
$n_D(III) = 1.528$
$\nu(I) = \nu(V) = 58.8$
$\nu(II) = \nu(IV) = 51.6$
$\nu(III) = 51.6$

With regard to the diaphragm 11, the axial distance thereof rearwardly from the vertex of the lens radius $R_3$ is substantially .00945F, and the diameter of the opening at $f/8.0$ is substantially .1118F for Example I.

The individual values of the optical parameters by which Example II of the present invention is constructed are given substantially in the same manner as Table III in Table IV herebelow,

*Table IV   (Example II)*

$F_{I,II} = F_{IV,V} = .462F$
$-F_{III} = .270F$
$S_2 = .022F$
$S_3 = .0195F$
$t_1 = t_5 = .0375F$
$t_2 = t_4 = .0191F$
$t_3 = .0146F$
$R_1 = -R_8 = .282F$
$-R_2 = R_7 = .226F$
$R_3 = -R_6 = 1.438F$
$-R_4 = R_5 = .288F$

The absolute values for the refractive index ($n_D$) and Abbe number ($\nu$) relating to the glasses from which the lens elements I to V are made are given substantially in the supplementary Table IV-A herebelow,

*Table IV-A   (Example II)*

$n_D(I) = n_D(V) = 1.611$
$n_D(II) = n_D(IV) = 1.529$
$n_D(III) = 1.529$
$\nu(I) = \nu(V) = 58.8$
$\nu(II) = \nu(IV) = 51.6$
$\nu(III) = 51.6$

The diaphragm 11 in this form of the invention lies at an axial distance rearwardly from the vertex of the lens radius $R_3$ of substantially .00987F, and the diameter of the opening at $f/8.0$ is substantially .1119F.

A chart #1 of specific numerical values, in which all scalar values are given in millimeters, is given herebelow for the optical parameters of Example I of the invention, and likewise a second chart #2 of specific numerical values is given for Example II of the invention, the symbolism used therein being the same as set forth in the foregoing description.

CHART 1
(Example I)

E.F.L.=508.0   B.F.L.=464.4   f/8.0

| Lens | Focal Length | Radii | Thicknesses | Spaces | $n_D$ | $\nu$ |
|---|---|---|---|---|---|---|
| I | F(I, V) = 228.687 | $R_1$ = 147.231 | $t_1$ = 25.3 | | 1.611 | 58.8 |
| II |  | $-R_2$ = 105.682 | $t_2$ = 6.9 | | 1.5286 | 51.6 |
|  |  | $R_3$ = 879.023 |  | $S_2$ = 12.9 |  |  |
| III | F(III) = −132.230 | $-R_4$ = 142.846 | $t_3$ = 6.6 |  | 1.5286 | 51.6 |
|  |  | $R_5$ = 142.846 |  | $S_3$ = 11.2 |  |  |
| IV |  | $-R_6$ = 879.023 | $t_4$ = 6.9 |  | 1.5286 | 51.6 |
| V | F(II, IV) = 228.687 | $R_7$ = 105.682 | $t_5$ = 25.3 |  | 1.611 | 58.8 |
|  |  | $-R_8$ = 147.231 |  |  |  |  |

All scalar values are given in millimeters.

CHART 2
(Example II)

E.F.L.=507.2   B.F.L.=468.7   f/8.0

| Lens | Focal Length | Radii | Thicknesses | Spaces | $n_D$ | $\nu$ |
|---|---|---|---|---|---|---|
| I | F(I, V) = 232.897 | $R_1$ = 142.98 | $t_1$ = 19.0 |  | 1.611 | 58.8 |
| II |  | $-R_2$ = 114.35 | $t_2$ = 9.7 |  | 1.529 | 51.6 |
|  |  | $R_3$ = 731.1 |  | $S_2$ = 11.2 |  |  |
| III | F(III) = −136.806 | $-R_4$ = 145.9 | $t_3$ = 7.4 |  | 1.529 | 51.6 |
|  |  | $R_5$ = 145.9 |  | $S_3$ = 9.9 |  |  |
| IV |  | $-R_6$ = 731.1 | $t_4$ = 9.7 |  | 1.529 | 51.6 |
| V | F(II, IV) = 232.897 | $R_7$ = 114.35 | $t_5$ = 19.0 |  | 1.611 | 58.8 |
|  |  | $-R_8$ = 142.98 |  |  |  |  |

All scalar values are given in millimeters.

Although only certain preferred forms of the invention have been shown and described in detail, other forms which are different in precise details are possible and the values of the optical parameters may be varied within the above-stated limits without departing from the spirit of the invention as defined in the claims appended herebelow.

We claim:
1. A quasi-symmetrical triplet type of copying objective having a relative aperture of substantially $f/8.0$ and working a magnifications between −.40× and minus unity, said objective being corrected for spherical aberration and chromatic aberration including lateral and longitudinal chromatism, coma, tangential and sagittal astigmatism, distortion and field curvature, said objective comprising two optically aligned and air spaced compound meniscus lens members which are symmetrically arranged concave toward each other, and
a double concave symmetrical lens member which is spaced axially from and between said two lens members and is designated III,
the meniscus lens members having an outer double convex lens element in contact with an inner double concave lens element, said outer front and rear elements being designated I and V respectively and said inner front and rear elements being designated II and IV respectively,
the focal length of each of said meniscus members having a value between .43F and .47F, and furthermore having a value of focal length for member III between −.25F and −.27F where F represents the equivalent focal length of said objective,
the constructional data relating to said objective having comprehensive values as given in the table herebelow wherein $S_2$ and $S_3$ designate the front and rear interlens air spaces respectively at either side of lens member III, $t_1$ to $t_5$ designate the axial thicknesses of the successive lens elements I to V, $R_1$ to $-R_8$ designate radii of the successive lens surfaces numbering from the front, the minus (−) sign used with certain R values signifying that such surfaces are concave toward incident light, and the refractive index and Abbe number of the glasses in said lens elements being designated respectively $n_D$ and $\nu$, $.020F < S_2 < .026F$
$.018F < S_3 < .024F$
$.037F < t_1 < .050F$
$.013F < t_2 < .020F$ $.012F < t_3 < .015F$
$.013F < t_4 < .020F$
$0.37F < t_5 < .050F$
$.28F < R_1 < .30F$
$.20F < -R_2 < .23F$
$1.42F < R_3 < 1.74F$
$.27F < -R_4 < .29F$
$.27F < R_5 < .29F$
$1.42F < -R_6 < 1.74F$
$.20F < R_7 < .23F$
$.28F < -R_8 < .30F$
$1.609 < n_D(\text{I and V}) < 1.613$
$1.527 < n_D(\text{II and IV}) < 1.530$
$1.527 < n_D(\text{III}) < 1.530$
$58.0 < \nu(\text{I and V}) < 61.0$
$51.0 < \nu(\text{II and IV}) < 53.0$
$51.0 < \nu(\text{III}) < 53.0$ 2. A quasi-symmetrical triplet type of copying objective having a relative aperture of substantially $f/8.0$ and working at magnifications between $-.40\times$ and minus unity, said objective being corrected for spherical aberration and chromatic aberration including lateral and longitudinal chromatism, coma, tangential and sagittal astigmatisim, distortion and field curvature, said objective comprising two optically aligned and air spaced compound meniscus lens members which are symmetrically arranged concave toward each other, and a double concave symmetrical lens member which is spaced axially from and between said two lens members and is designated III, the meniscus lens members each having an outer double convex lens element in contact with an inner double concave lens element, said outer front and rear elements being designated I and V respectively and said inner front and rear elements being designated II and IV respectively, the values of the lens parameters of lens elements I to V being given substantially in the table herebelow wherein $F_{I,II}$ and $F_{IV,V}$ designate the focal lengths of the front and rear doublet meniscus lens members respectively and $-F_{III}$ designates the focal length of the interposed negative lens member III, $S_2$ and $S_3$ designate the front and rear interlens air spaces respectively at either side of member III, $t_1$ to $t_5$ designate the axial thicknesses of the successive lens elements I to V, $R_1$ to $-R_8$ designate the radii of the successive lens surfaces numbering from the front, the minus (—) sign used with certain R values signifying that such surfaces are concave toward incident light, and the refractive index and Abbe number of the glasses from which said elements are made being designated respectively by $n_D$ and $\nu$, said values being given in terms of F which represents the equivalent focal length of said objective, $F_{I,II} = F_{IV,V} = .45F$
$-F_{III} = -.26F$
$S_2 = .025F$
$S_3 = .022F$
$t_1 = t_5 = .0498F$
$t_2 = t_4 = .0136F$
$t_3 = .130F$
$R_1 = -R_8 = .29F$
$-R_2 = R_7 = .208F$
$R_3 = -R_6 = 1.73F$
$-R_4 = R_5 = .281F$
$n_D(\text{I}) = n_D(\text{V}) = 1.611$
$n_D(\text{II}) = n_D(\text{IV}) = 1.528$
$n_D(\text{III}) = 1.528$
$\nu(\text{I}) = \nu(\text{V}) = 58.8$
$\nu(\text{II}) = \nu(\text{IV}) = 51.6$
$\nu(\text{III}) = 51.6$ the $n_D$ and $\nu$ values being absolute values.

3. A quasi-symmetrical triplet type of copying objective having a relative aperture of substantially $f/8.0$ and working at magnifications between $-.40\times$ and minus unity, said objective being corrected for spherical aberration and chromatic aberration including lateral and longitudinal chromatism, coma, tangential and sagittal astigmatism, distortion and field curvature, said objective comprising two optically aligned and air spaced compound meniscus lens members which are symmetrically arranged concave toward each other, and a double concave symmetrical lens member which is spaced axially from and between said two lens members and is designated III, the meniscus lens members each having an outer double convex lens element in contact with an inner double concave lens element, said outer front and rear elements being designated I and V respectively and said inner front and rear elements being designated II and IV respectively, the values of the lens parameters of lens elements I to V being given substantially in the table herebelow wherein $F_{I,II}$ and $F_{IV,V}$ designate the focal lengths of the front and rear doublet meniscus lens members respectively and $-F_{III}$ designates the focal length of the interposed negative lens member III, $S_2$ and $S_3$ designate the front and rear interlens air spaces respectively at either side of member III, $t_1$ to $t_5$ designate the axial thicknesses of the successive lens elements I to V, $R_1$ to $-R_8$ designate the radii of the successive lens surfaces numbering from the front, the minus (—) sign used with certain R values signifying that such surfaces are concave toward incident light, and the refractive index and Abbe number of the glasses from which said elements are made being designated respectively by $n_D$ and $\nu$, said values being given in terms of F which represents the equivalent focal length of said objective, $F_{I,II} = F_{IV,V} = .462F$
$-F_{III} = .270F$
$S_2 = .022F$
$S_3 = .0195F$
$t_1 = t_5 = .0375F$
$t_2 = t_4 = .0191F$
$t_3 = .0146F$
$R_1 = -R_8 = .282F$
$-R_2 = R_7 = .226F$
$R_3 = -R_6 = 1.438F$
$-R_4 = R_5 = .288F$
$n_D(\text{I}) = n_D(\text{V}) = 1.611$
$n_D(\text{II}) = n_D(\text{IV}) = 1.529$
$n_D(\text{III}) = 1.529$
$\nu(\text{I}) = \nu(\text{V}) = 58.8$
$\nu(\text{II}) = \nu(\text{IV}) = 51.6$
$\nu(\text{III}) = 51.6$ the $n_D$ and $\nu$ values being absolute values.

4. A quasi-symmetrical triplet type of copying objective working at magnifications between $-.40\times$ and $-1.0\times$, said objective being well corrected for all spherical and chromatic abberations, as well as coma, astigmatism, field curvature and distortion, said objective consisting of two duplicate positive meniscus compound lenses having positive elements numbered I and V and negative elements numbered II and IV, and further consisting of a double concave negative singlet lens numbered III and interposed between the compound lenses, the numerical values of the constructional data for said lenses being given in the chart herebelow wherein $R_1$ to $R_8$ represent the radii of curvature of the successive lens surfaces, and the minus (—) sign used therewith signifies that the radius of the designated surface has its center of curvature located on the entrant side of said objective with respect to the vertex of said surface,

CHART 1
(Example I)

E.F.L.=508.0   B.F.L.=464.4   f/8.0

| Lens | Focal Length | Radii | Thicknesses | Spaces | $n_D$ | $\nu$ |
|---|---|---|---|---|---|---|
| I | F(I, V) =228.687 | $R_1$=147.231 | $t_1$=25.3 | | 1.611 | 58.8 |
| II | | $-R_2$=105.682 | $t_2$=6.9 | | 1.5286 | 51.6 |
|  |  | $R_3$=879.023 |  | $S_2$=12.9 |  |  |
| III | F(III) =−132.230 | $-R_4$=142.846 | $t_3$=6.6 | | 1.5286 | 51.6 |
|  |  | $R_5$=142.846 |  | $S_3$=11.2 |  |  |
| IV |  | $-R_6$=879.023 | $t_4$=6.9 | | 1.5286 | 51.6 |
| V | F(II, IV)=228.687 | $R_7$=105.682 | $t_5$=25.3 | | 1.611 | 58.8 |
|  |  | $-R_8$=147.231 |  |  |  |  |

All scalar values are given in millimeters.

5. A quasi-symmetrical triplet type of copying objective working at magnifications between −.40× and −1.0×, said objective being well corrected for all spherical and chromatic abberations, as well as coma, astigmatism, field curvature, distortion and oblique spherical aberration, said objective consisting of two duplicate positive meniscus compound lenses having positive elements numbered I and V and negative elements numbered II and IV, and further consisting of a double concave negative singlet lens numbered III and interposed between the compound lenses, the numerical values of the constructional data for said lenses being given in the chart herebelow wherein $R_1$ to $R_8$ represent the radii of curvature of the successive lens surfaces, and the minus (−) sign used therewith signifies that the radius of the designated surface has its center of curvature located on the entrant side of said objective with respect to the vertex of said surface,

CHART 2
(Example II)

E.F.L.=507.2   B.F.L.=468.7   f/8.0

| Lens | Focal Length | Radii | Thicknesses | Spaces | $n_D$ | $\nu$ |
|---|---|---|---|---|---|---|
| I | F(I, V) =232.897 | $R_1$=142.98 | $t_1$=19.0 | | 1.611 | 58.8 |
| II | | $-R_2$=114.35 | $t_2$=9.7 | | 1.529 | 51.6 |
|  |  | $R_3$=731.1 |  | $S_2$=11.2 |  |  |
| III | F(III) =−136.806 | $-R_4$=145.9 | $t_3$=7.4 | | 1.529 | 51.6 |
|  |  | $R_5$=145.9 |  | $S_3$=9.9 |  |  |
| IV |  | $-R_6$=731.1 | $t_4$=9.7 | | 1.529 | 51.6 |
| V | F(II, IV)=232.897 | $R_7$=114.35 | $t_5$=19.0 | | 1.611 | 58.8 |
|  |  | $-R_8$=142.98 |  |  |  |  |

All scalar values are given in millimeters.

No references cited.

JEWELL H. PEDERSEN, *Primary Examiner.*
JOHN K. CORBIN, *Examiner.*